(12) United States Patent
Travis

(10) Patent No.: US 8,016,475 B2
(45) Date of Patent: Sep. 13, 2011

(54) PRISMATIC FILM BACKLIGHT

(75) Inventor: Adrian Travis, South Devon (GB)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 12/444,906

(22) PCT Filed: Oct. 10, 2007

(86) PCT No.: PCT/GB2007/003848
§ 371 (c)(1),
(2), (4) Date: Apr. 9, 2009

(87) PCT Pub. No.: WO2008/044018
PCT Pub. Date: Apr. 17, 2008

(65) Prior Publication Data
US 2010/0014312 A1    Jan. 21, 2010

(30) Foreign Application Priority Data
Oct. 10, 2006  (GB) .................................. 0620014.1

(51) Int. Cl.
*F21V 7/04* (2006.01)

(52) U.S. Cl. ........ 362/618; 362/624; 362/628; 362/339; 362/328

(58) Field of Classification Search .......... 362/606–607, 362/617–620, 19, 624–626, 628, 339, 328–330
See application file for complete search history.

(56) References Cited

U.S. PATENT DOCUMENTS

| | | | |
|---|---|---|---|
| 4,148,563 A | | 4/1979 | Herbert |
| 6,049,649 A | * | 4/2000 | Arai .............................. 385/133 |
| 6,152,569 A | | 11/2000 | Aizawa |
| 6,437,921 B1 | | 8/2002 | Whitehead |
| 6,951,400 B2 | * | 10/2005 | Chisholm et al. ............... 362/29 |
| 2003/0086680 A1 | | 5/2003 | Saccomanno |
| 2008/0298084 A1 | * | 12/2008 | Yang et al. .................... 362/607 |

FOREIGN PATENT DOCUMENTS

| | | |
|---|---|---|
| CN | 1438397 A | 8/2003 |
| EP | 0421810 A2 | 4/1991 |
| JP | 2000305083 A | 11/2000 |
| WO | WO9222838 A1 | 12/1992 |

OTHER PUBLICATIONS

European Office Action mailed Mar. 29, 2011 for European Patent Application No. 07824102.3, a counterpart foreign application of U.S. Appl. No. 12/444,906.

Office Action for EP Patent Application 07 824 102.3, mailed on Mar. 29, 2011, Adrian R.L. Travis, "Prismatic Film Backlight".

* cited by examiner

*Primary Examiner* — Thomas Sember
(74) *Attorney, Agent, or Firm* — Lee & Hayes, PLLC

(57) ABSTRACT

A selectively light-reflecting sheet (30) includes a prismatic film (1) with parallel prisms (10) on its face, a low-index film (3) on the prisms and a layer (5) on the low-index film, this layer having a substantially flat surface. This results in a low effective index, which means that light incident at steeper angles on the prismatic film (1) will pass through it. This "leaky" effect can be used in conjunction with a reflector sheet (20) in a tapered-waveguide arrangement to construct a lightweight backlight.

20 Claims, 3 Drawing Sheets

PRISMATIC FILM BACKLIGHT

RELATED APPLICATIONS

This application is a National Stage of International Application No. PCT/GB2007/003848, filed 10 Oct., 2007, which claims priority from Great Britain Patent Application No. 0620014.1, filed on 10 Oct., 2006. Both applications are incorporated herein by reference.

This invention is directed among other things to making a light-weight, slim, inexpensive back-light which distributes rays from a few light-emitting diodes or other point sources uniformly across the back of a liquid crystal display with no need for colour control.

Liquid-crystal displays (LCDs) are normally illuminated by a panel of uniform brightness to see the picture but this panel, called a back-light, can account for almost half the cost of a liquid crystal display. Backlights have, until recently, comprised an array of fluorescent tubes. These provide a good light but they contain mercury, which is difficult to dispose of safely so attempts have been made to replace the fluorescent tubes with light-emitting diodes (LEDs). Either many light-emitting diodes are needed to fill the area of a panel or there must be a gap between the light-emitting diodes and liquid-crystal display so that the light from each light-emitting diode can fan out to a larger area. Furthermore, LED's typically emit at wavelengths that vary slightly from one LED to another and vary as the LED ages, so the current to each LED must be controlled in order to correct for this. LED backlights are therefore both thick and expensive.

Fewer fluorescent tubes or LEDs are needed if a wedge-shaped light-guide is used to spread the illumination across the back of an LCD, as shown for instance in EP 663600 by Nitto Jushi, light from a tube enters the thick end of the wedge and is internally reflected at even steeper angles until it exits at a point on the face that corresponds to the angle of injection. However, rays form bands after propagation through a simple wedge. That this is so can be demonstrated by considering what happens as the angle of injection of a ray from a point source is varied, say from a steeper angle of injection to a shallower. The point of ray emission will move a certain distance towards the wedge tip until the critical angle is reached, at which point the ray will undergo an extra reflection so that the point of emission hops to a new position, leaving part of the wedge unilluminated.

Bands in a wedge-shaped light-guide can be removed by ensuring that all rays undergo the same number of reflections before exit, whatever their angle of injection. One way of doing this is to insert between the light source and the wedge a section of light-guide of constant thickness, then to curve one side of the wedge according to a particular profile. This is explained in the applicant's earlier WO 03/13131. However, high-index folding prisms are then desirable in order that the section of constant thickness does not protrude to one side of the display, and high-index plastics are expensive. In any case, wedge panels large enough to illuminate a big LCD require big, expensive moulds, must spend a long time cooling inside them because the wedge thickness scales with size, and use large, expensive volumes of material.

Prismatic films are also known for backlighting. Such films are sheets of plastics material flat on one side and moulded on the other into parallel prisms, usually with an apex angle of about 90°. They are almost perfect reflectors for light incident in a plane perpendicular to the film and containing the axis of a prism. They are used for instance in EP 762183, which has films enclosing a wedge-shaped guide, the axes of the films being at 90° to each other. Here the prisms are used for adjusting the direction of light leaving the backlight panel.

Light can also be guided between two spaced sheets of prismatic film with parallel axes provided that the component of wave vector perpendicular to the prism axes is not large. This is exploited for instance in US 2004/012943 by Toyooka. Such light-guides are inexpensive and light-weight and more efficient in reflection than metal surfaces. At least for light whose wave-vector component in the plane is parallel to the prism axes, they reflect light whatever the component of wave vector perpendicular to the film surface, even vertically incident, so one cannot be combined with the taper idea to spread light uniformly across a screen.

According to this invention there is provided a film with a lower layer of prismatic material, an upper or cover layer with a flat surface, and a layer of low-index material between them with a thickness of about 10µ, the film as a consequence having a critical angle such that rays incident at less than the critical angle are transmitted and those incident at greater than the critical angle are passed. The intermediate layer should have an index of about 1.2-1.3, assuming that the prismatic and cover layers are made of conventional materials with an index of about 1.5.

The intermediate layer thus in effect reduces the refractive index of the prismatic layer so that light incident at sufficiently large angles to the plane is transmitted. If one such composite layer is placed opposite a reflecting layer at a slight angle, forming a taper in the prism axis direction, the tapered-waveguide principle can then be used to "extract" light over the face of the prismatic sheet.

In principle the effect could be realised if a simple prismatic film, but made of a material of very low refractive index, were used, but such materials are exotic.

For a better understanding of the invention, embodiments of it will now be described, by way of example, with reference to the accompanying drawings, in which.

Figure 1:
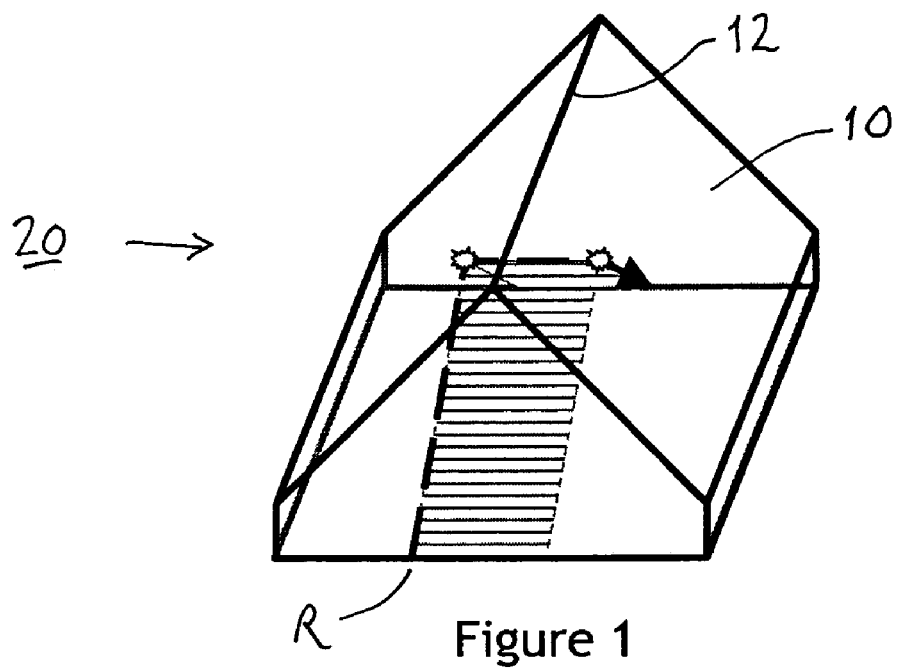
FIG. 1 shows a prior-art arrangement by which ray reflects off conventional prismatic film.

FIG. 1 shows how a ray R is reflected off the apex 12 of a 90° prism 10 running along a film 20 of such linear prisms. The ray enters the film, strikes one face of the prism, is reflected to the other face while continuing in the longitudinal direction, and is reflected a second time at the same angle as it entered, merely being shifted in the transverse direction. This shift is indicated by the striped band in the diagram.

Figure 2:
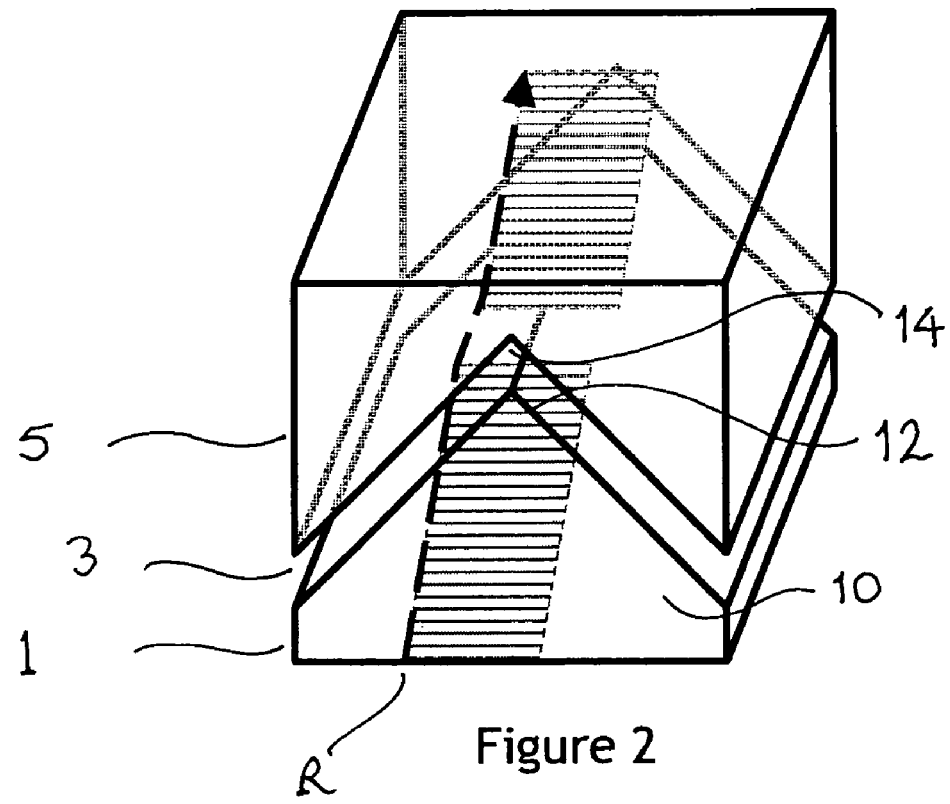
FIG. 2 shows how a ray reflects off a film in accordance with the present invention.

The prisms on the film of FIG. 2 are also right-angled prisms 10, but they are coated with a thin layer of low-index material 3, then coated with a thick layer 5 of high-index material whose top surface is made approximately flat. This might be achieved by, for example, placing two pieces of conventional prismatic film against each other with prism apex 12 against prism base 14, then filling the space between the prisms with a layer of water or other low-index material approximately 10 microns thick. Alternatively, one might spray onto the prisms of a piece of conventional prismatic film a 10-micron layer of low-index polymer such as polytetrafluoroethylene, then spread on top of the low-index film a thick layer of flattened ultra-violet-curing polymer. Low-index materials can also be made out of aerogels.

As can be seen, a ray R incident on the lower surface at a sufficiently steep angle passes into the low-index layer, instead of being reflected, and enters the upper prismatic layer 14, leaving via its smooth upper surface. Shallower rays are reflected as before.

Figure 3:
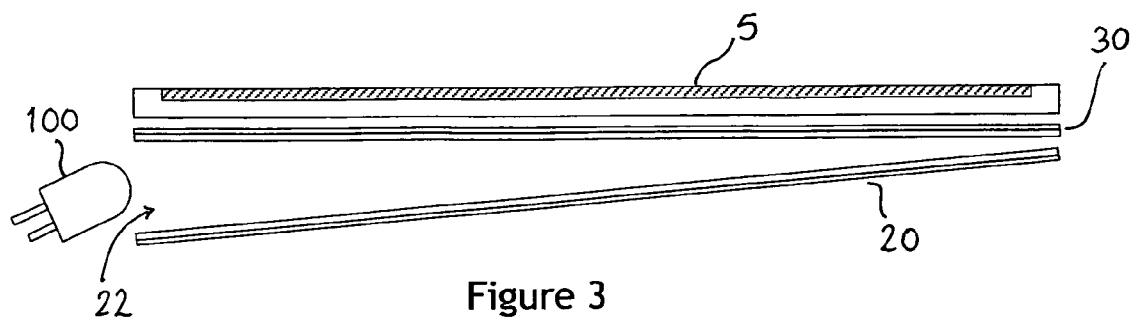
FIG. 3 shows how a film according to the present invention can be combined with conventional prismatic film in order to distribute illumination across an LCD.

Place a film 20 according to the present invention facing but at a slight angle to a mirror or conventional sheet of prismatic film 30 as shown in FIG. 3, and the result is a light guide which, with a light source 100 at the thick end 22, provides a back-light, for instance for a liquid-crystal display. Light is reflected between the converging films, becoming steeper at each bounce, until it is transmitted through the upper film 30 at a point determined by its initial angle of injection.

If the light source has sufficient area that it illuminates the whole of the thick end, then emission from the back-light will be uniform. Examples of light sources with sufficient area are a thick fluorescent tube or a dense array of LED's, but it is preferable that the source be one or just a few LED's. The LCD is indicated at 5.

Figure 4:
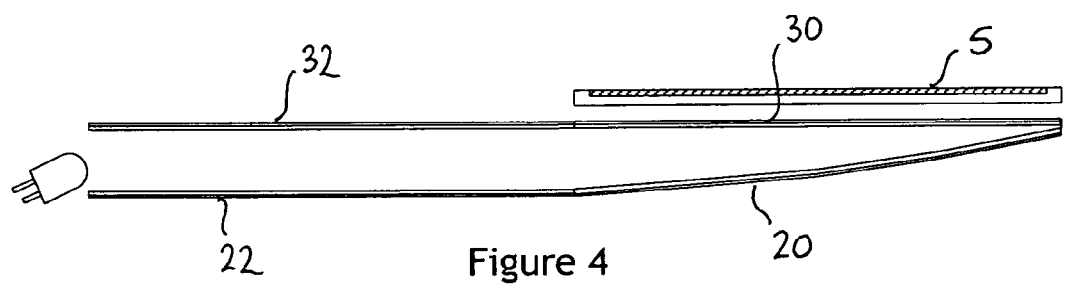
FIG. 4 shows how the spacing between mirror and prism laminate may be designed so that all rays from an LED undergo the same number of bounces.

A back-light emitting uniform illumination can be produced from a single LED or a short line of LED's if, between the back-light and LED's, there is inserted an input waveguide formed of a pair of parallel sheets 22, 32 of prismatic film as shown in FIG. 4 and if the one surface or other of the angled films 20 (or both) is given an appropriate curve. The shape of this curve can be calculated according to patent application WO 03/013151 by the applicant. (The curve would be smooth, in contrast to the approximation shown in FIG. 4). The light fans out in the input waveguide, and the total number of bounces is made constant whatever the ray angle.

Figure 5:
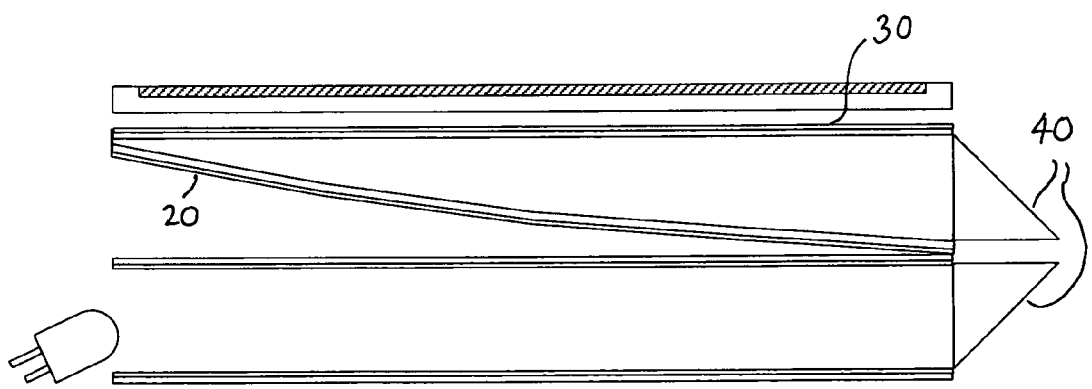
FIG. 5 shows how the system of FIG. 3 may be folded by a pair of prisms.
Figure 6:
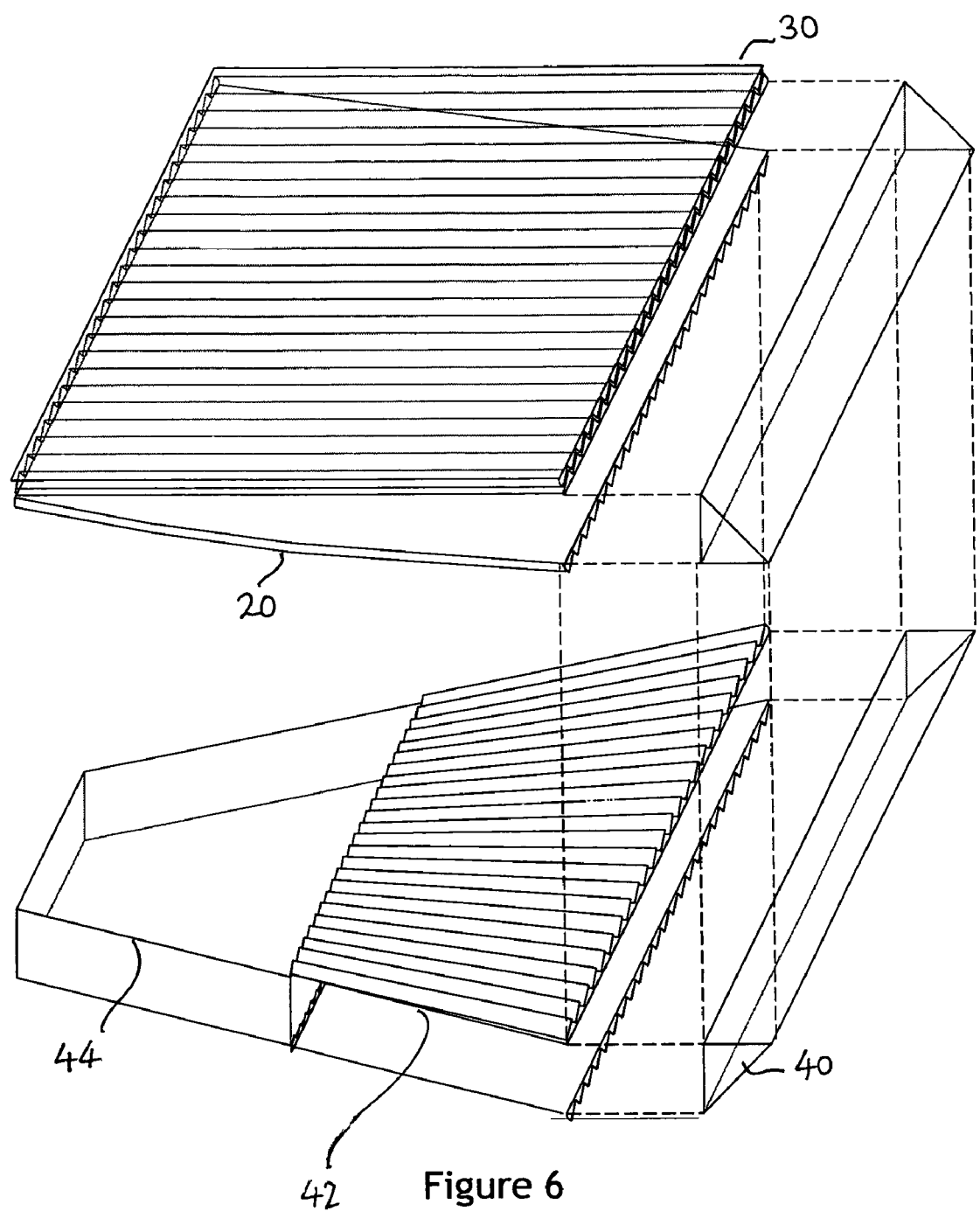
FIG. 6 is an exploded perspective view of the layout depicted in FIG. 4.

The parallel sheets of FIG. 4 can be folded behind the angled films using a pair of folding prisms 40 as shown in FIG. 5. Because the refractive index of air is so low, the light will easily enter the folding prisms, which can be made with inexpensive low-index plastic such as polymethylmethacrylate (PMMA). The hypotenuse of the folding prisms should either be coated with a mirror material, or embossed with prismatic film. Rays should, as mentioned above, ideally be allowed to fan out between the parallel sheets 22, 32, but the retro-reflective action of prismatic film works against this. FIG. 6 shows how one can use the alternatives of flat mirror film 44, or prismatic film 42 in which the prisms are aligned parallel to the desired fan-out of the rays, or a combination of both.

While it is a variation in spacing between the films, i.e. the inclined orientation, which is used to distribute light in the embodiment described, one can also have parallel films with a variation in refractive index of the low-index layer adjacent to the prisms, or even (if the simple low-index prism version is used) of the prism layer itself.

The invention claimed is:

1. A light guide comprising:
   a prismatic film with parallel prisms on a first side of the prismatic film;
   a low-index film on the prisms as an intermediate layer;
   a cover layer having a first surface that contacts the intermediate layer, the cover layer having a substantially flat second surface opposite to the first surface; and
   a reflective layer facing a second side of the prismatic film, the reflective layer disposed at an angle with respect to the second side of the prismatic film.

2. A light guide according to claim 1, in which a thickness of the intermediate layer is about 10 µm.

3. A light guide according to claim 1, in which the prismatic film and the cover layer have a refractive index of about 1.5, and the intermediate layer has a refractive index of about 1.2-1.3.

4. A light guide according to claim 1, in which the prismatic film and the cover layer are made of a plastic comprising at least one of: polycarbonate or acrylic materials.

5. The light guide according to claim 1, in which:
   the parallel prisms on the prismatic film are first parallel prisms; and
   the cover layer includes second parallel prisms on the first surface contacting the intermediate layer.

6. The light guide according to claim 5, in which the second parallel prisms have prism apexes aligned with prism bases of the first parallel prisms on the prismatic film.

7. The light guide according to claim 1, in which the parallel prisms have apex angles of about 90 degrees.

8. A light guide comprising:
   a sheet comprising:
      a prismatic film with parallel prisms on a first side;
      a cover layer including a first surface facing the parallel prisms, the cover layer having a substantially flat second surface opposite to the first surface; and
      a low-index intermediate layer located between the prismatic film and the cover layer; and
   a reflective layer disposed in a spaced relationship with the sheet, the reflective layer positioned to reflect light toward a second side of the prismatic film.

9. A light guide according to claim 8, wherein the reflective layer is disposed at an angle to the sheet, as seen along a prism axis direction.

10. A light guide according to claim 9, further comprising: a parallel portion of the light guide formed of a parallel pair of reflectors adjoining a thick end of a tapered portion of the light guide, the tapered portion including the reflective layer disposed at the angle.

11. The light guide according to claim 9, in which the angle at which the reflective layer is disposed varies progressively along the prism axis direction to impart a curve to the reflective layer.

12. The light guide according to claim 10, in which the parallel portion of the light guide includes a pair of parallel sheets as the pair of parallel reflectors, the pair of parallel sheets adjoining the thick end of the tapered portion of the light guide.

13. The light guide according to claim 8, in which:
   the parallel prisms on the prismatic film are first parallel prisms; and
   the cover layer includes second parallel prisms on the first surface facing the first parallel prisms.

14. The light guide according to claim 13, in which the second parallel prisms have prism apexes aligned with prism bases of the first parallel prisms on the prismatic film.

15. The light guide according to claim 8, in which the parallel prisms have apex angles of about 90 degrees.

16. A display apparatus comprising:
   a light guide comprising:
      a prismatic film with first parallel prisms on a first side of the prismatic film;
      an intermediate layer including a low-index film deposited on the first parallel prisms on the first side of the prismatic film; and
      a cover layer having a first surface contacting the intermediate layer opposite to the prismatic film, the cover layer having second parallel prisms on the first surface contacting the intermediate layer, the second parallel prisms having prism apexes aligned with prism bases of the first parallel prisms, the cover layer having a substantially flat second surface opposite to the first surface; and a reflective layer facing a second side of the prismatic film, the reflective layer positioned at an angle with respect to the second side of the prismatic film to reflect light into the second side of the prismatic film; and a light source arranged to inject light into the light guide along a prism axis direction.

17. The display apparatus of claim 16 further comprising a display.

18. The display apparatus of claim 16 in which the first parallel prisms and the second parallel prisms have apex angles of about 90 degrees.

19. The display apparatus of claim 16 in which the light guide includes a parallel portion having a pair of parallel sheets as a pair of parallel reflectors, the pair of parallel sheets adjoining a thick end of a tapered portion of the light guide that includes the reflective layer disposed at the angle.

20. The display apparatus of claim 19 in which the parallel portion of the light guide fans out in a direction lateral to a prism axis direction.

* * * * *